United States Patent [19]

Ninomiya et al.

[11] Patent Number: 5,532,935
[45] Date of Patent: Jul. 2, 1996

[54] ELECTRONIC DEVICE CAPABLE OF AUTOMATICALLY CONTROLLING POWER ASSUMPTION OF COMPONENTS EMPLOYED IN ACCORDANCE WITH OPERATING TIME PERIOD BY USER

[75] Inventors: Ryoji Ninomiya, Fussa; Hideaki Muraya; Shizuka Gunji, both of Oume, all of Japan

[73] Assignee: Kabushiki Kaisha Toshiba, Kawasaki, Japan

[21] Appl. No.: 66,097

[22] PCT Filed: Oct. 2, 1992

[86] PCT No.: PCT/JP92/01274

§ 371 Date: Oct. 13, 1993

§ 102(e) Date: Oct. 13, 1993

[87] PCT Pub. No.: WO93/07557

PCT Pub. Date: Apr. 15, 1993

[30] Foreign Application Priority Data

Oct. 2, 1991 [JP] Japan ................... 3-255581

[51] Int. Cl.$^6$ ........................... H02J 1/00
[52] U.S. Cl. .......... 364/492; 307/31; 340/636; 364/152; 364/707; 395/750
[58] Field of Search ............... 307/31, 38; 340/636; 364/148, 152, 492, 569, 707; 395/750

[56] References Cited

U.S. PATENT DOCUMENTS 3,522,421  8/1970  Miller ............................ 364/492
3,535,560 10/1970  Cliff .............................. 327/554
4,907,183  3/1990  Tanaka ........................... 364/707
4,980,836 12/1990  Carter et al. ................ 307/31 X
5,083,266  1/1992  Watanabe .................... 395/750 X

FOREIGN PATENT DOCUMENTS

3-48914  3/1991  Japan.
4-192015  7/1992  Japan.

*Primary Examiner*—Edward R. Cosimano
*Attorney, Agent, or Firm*—Oblon, Spivak, McClelland, Maier & Neustadt

[57] ABSTRACT

An electronic device including a portable computer or a word processor, which is driven by a battery (13). This device has a device component (47) driven by the battery (13), a menu screen for setting an operation time period during which the device is operated by the battery (13), and a power source controller (37) for detecting the remaining capacity of the battery (13) and controlling the amount of power supplied to the device component from the battery on the basis of an operation time period set on the menu screen and the remaining capacity of the battery. When the user sets the operation time period on the menu screen, the power source controller (37) calculates the amount of power to be consumed by the electronic device for the set operation time period, on the basis of the set time period and the remaining capacity of the battery (13). The power source controller (37) automatically controls the amount of power supplied from the battery (13) to the device component (47) so that the actual power consumption can be equal to the calculated one.

14 Claims, 9 Drawing Sheets

```
POWER SAVE MENU

AUTO CONTROL         :   DISABLE

CPU SLEEP MODE       :   ENABLE

HDD AUTO-OFF         :   DISABLE

DISPLAY AUTO-OFF     :   DISABLE
```

FIG. 3A

```
POWER SAVE MENU

AUTO CONTROL              :   ENABLE
       MAXIMUM OPERATION
       TIME PERIOD                 4 HOURS AND 40 MINUTES
       MINIMUM OPERATION
       TIME PERIOD                 1 HOURS AND 50 MINUTES

OPERATION
       TIME PERIOD                 3 HOURS AND 30 MINUTES

CPU SLEEP MODE            :   DISABLE
    HDD AUTO-OFF              :   DISABLE
    DISPLAY AUTO-OFF          :   DISABLE
```

ELECTRONIC DEVICE CAPABLE OF AUTOMATICALLY CONTROLLING POWER ASSUMPTION OF COMPONENTS EMPLOYED IN ACCORDANCE WITH OPERATING TIME PERIOD BY USER

BACKGROUND OF THE INVENTION

1. Field of the Invention

This invention relates to an electronic device driven by a battery, and in particular to a portable computer or word processor in which the consumption of power required to operate power-consumption-variable components is controlled.

2. Discussion of the Background

The operating time period of a computer driven by a battery is determined by the amount of power consumed thereby since the maximum capacity of a battery is limited. The amount of power consumed by a computer varies depending upon factors such as the brightness of the display device employed, the frequency of the operation clock determining the speed of processing by the CPU, and the time periods during which power is supplied to various input/output devices. Power consumption will be high if the brightness of the display device is set to high level, the frequency of the operation clock is high, and power is supplied to each input/output device for long time periods. The greater the power consumption, the shorter the operating time period of the computer.

A battery-driven computer therefore has a power save function for prolonging its operating period to as long as possible. This function comprises a CPU sleep function, a magnetic disk (HDD) auto-power-off function, a display auto-power-off function, etc. Techniques relating to the power save function are disclosed in U.S. Pat. Nos. 4,907,183, 4,980,836, and 5,083,266.

In the case of the conventional power save functions, however, even if the user wishes to use the computer for a given time period, a power consumption amount corresponding to the time period desired cannot be set. In other words, although the user is aware that the operating time period of the computer will be prolonged by virtue of the power save functions, he cannot know at what degree each power save function is effected so as to use the computer for a desired time period.

SUMMARY OF THE INVENTION

It is an object of the invention to provide an electronic device capable of automatically controlling the power consumption of each component in accordance with an operating time period designated by the user.

It is another object of the invention to provide an electronic device capable of automatically controlling the brightness level of the display device employed in accordance with an operating time period designated by the user.

It is a further object of the invention to provide an electronic device capable of automatically controlling a plurality of power save functions in accordance with an operating time period designated by the user.

It is another object of the invention to provide an electronic device capable of automatically controlling the level of each power save function on the basis of the estimated power consumption of a given component.

It is yet another object of the invention to provide an electronic device capable of monitoring the duty cycle of each component at regular intervals, and correcting the power consumption of the component so that the device can be used for a time period designated by the user.

The present invention can provide an electronic device driven by a battery, comprising: a device component driven by power supplied from the battery; time period setting means for setting an operating time period during which the electronic device is operated by the battery; capacity detection means for detecting a remaining capacity of the battery; and power control means for controlling the amount of power supplied to the device component on the basis of the operating time period set by the time period setting means and the remaining capacity detected by the capacity detection means.

Since only user's setting of an operation time period on the time period setting means can cause the power control means to automatically control the power consumption on the basis of the battery capacity and the set time period, the user can operate the device efficiently. Further, since the power control means sets a power consumption amount in accordance with the set operation time period, the device can operate efficiently for the set time period.

DESCRIPTION OF THE PREFERRED EMBODIMENTS

The embodiment of the present invention will now be explained with reference to the accompanying drawings.

Figure 1:
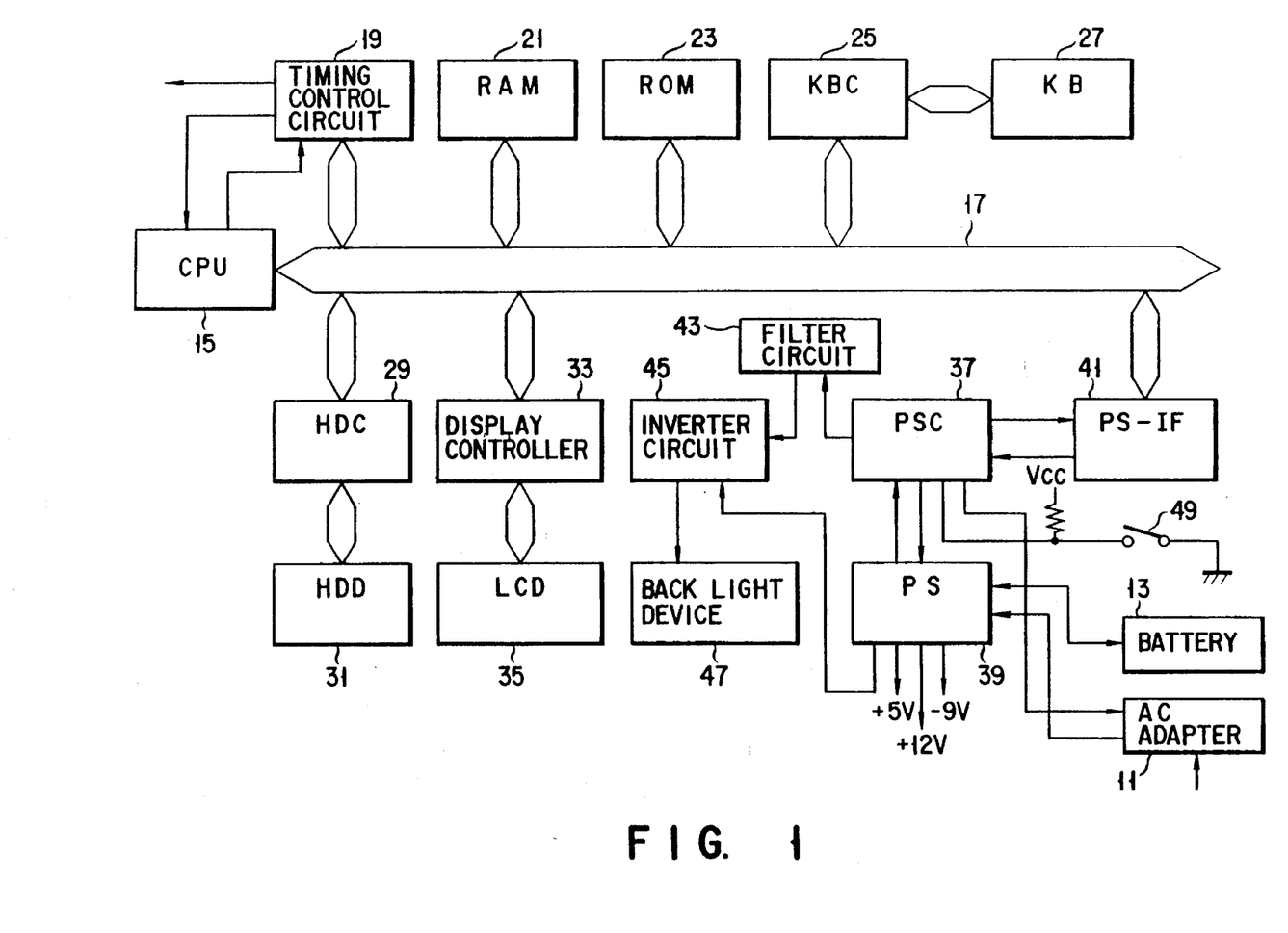
FIG. 1 is a block diagram, showing a computer system to which the present invention is applied.

FIG. 1 is a block diagram, showing a computer system to which the present invention is applied. As is shown in FIG. 1, the computer system is driven by an external AC power source connected thereto via an AC adapter 11, or by a battery 13 detachably mounted therein. A central processing unit (CPU) 15 for controlling the overall computer system is connected to a system bus 17. A timing control circuit 19 for supplying a clock signal to the CPU 15 and other components is connected to the system bus 17. If the CPU 15 does not perform effective control, it supplies the timing control circuit 19 with a CPU sleep control signal in accordance with an instruction supplied from a control program system (BIOS) for controlling each component of the computer. When the circuit 19 receives the CPU sleep control signal, it retards or stops a CPU clock signal supplied to the CPU 15. The function for retarding or stopping the CPU clock signal under certain conditions will be hereinafter called a "CPU sleep function".

A random access memory (RAM) 21 stores an operating system (OS), an application program, etc. The RAM 21 is connected to the system bus 17. A read only memory (ROM) 23 stores programs peculiar to the BIOS and the system. The ROM 23 is connected to the system bus 17. The CPU 15 reads programs from the RAM 21 and ROM 23, and operates the system in accordance with the read programs. A keyboard controller (KBC) 25 for controlling a keyboard 27 is connected to the system bus 17. The KBC 25 supplied the system bus 17 with data input to the keyboard 27 by the operator. This invention is applicable to a case where an on-line character recognition device such as a stylus pen or a tablet is used in place of the keyboard 27.

A magnetic disk controller (HDC) 29 controls a magnetic disk device (HDD) 31, and is connected to the system bus 17. The HDD 31 is a non-volatile external memory device, and has a spindle motor for rotating a disk. If the HDD 31 performs effective processing, the HDC 29 stops the spindle motor in accordance with an instruction from the BIOS. The function for stopping the spindle motor of the HDD 31 will be hereinafter called an "HDD auto-off function". A display controller 33 controls a liquid crystal display device (LCD) 35. The LCD 35 is a transmissible display device. A back light device 47 is mounted on a reverse side of the LCD 35. The display controller 33 is connected to the system bus 17.

A power source controller (PSC) 37 controls a power source (PS) 39. The PSC 37 performs data communication with the CPU 15 via a power source interface circuit (PS-IF) 41, and supplies a pulse signal to a filter circuit 43, which in turn converts the pulse signal to an analog signal.

The AC adapter 11 is detachably connected to the computer system, and shapes and smoothes an external current AC, thereby outputting a DC power to the PS 39. When the AC adapter 11 is connected to the computer system, the PS 39 generates voltage for driving the computer system, from the DC power supplied from the AC adapter 11. On the other hand, when the adapter is disconnected from the computer system, the PS 39 generates voltage for driving the computer, from the DC power supplied from the battery 13. The driving voltage of the computer system is, for example, +5 V, +12 V, or −9 V.

The PS 39 supplies voltage to an inverter circuit 45, which in turn increases the voltage supplied from the PS 39, to an AC voltage of 800 V to 1000 V. The inverter circuit 45 supplies the increased voltage to the back light circuit 47. In accordance with the level of an analog signal output from the filter circuit 43, the circuit 45 varies the current value of power to be supplied to the back light circuit 47. The circuit 47 has a fluorescent tube whose brightness is varied in accordance with the current value from the inverter circuit 45. A power switch 49 turns on and off the overall computer system. When the switch 49 is turned on by the user, a power source on-signal is input to the PSC 37, which in turn determines from the power source on-signal that the power switch 49 is turned on, and then causes the PS 39 to generate driving voltage. When the switch 49 is turned off by the user, a power source off-signal is input to the PSC 37, which in turn determines from the power source off-signal that the power switch 49 is turned off, and then causes the PS 39 to stop the supply of the driving voltage. When there is no input to the keyboard 27 for a predetermined time period, the BIOS supplies the PSC 37 with a signal indicating this, and the PSC 37 controls the back light device 47 so as to lower the level of the brightness of the fluorescent tube. The function for lowering the level of the brightness of the display device under certain conditions will be hereinafter called a "display auto-off function". This invention can be realized by use of a plasma display device (PDD) in place of the LCD 35. In the case of using the PDD, the display auto-off function directly lowers the level of the brightness of a light emission element in the PDD. The display auto-off function, the HDD auto-off function, and the CPU sleep function are generally called "power save functions".

Figure 2:
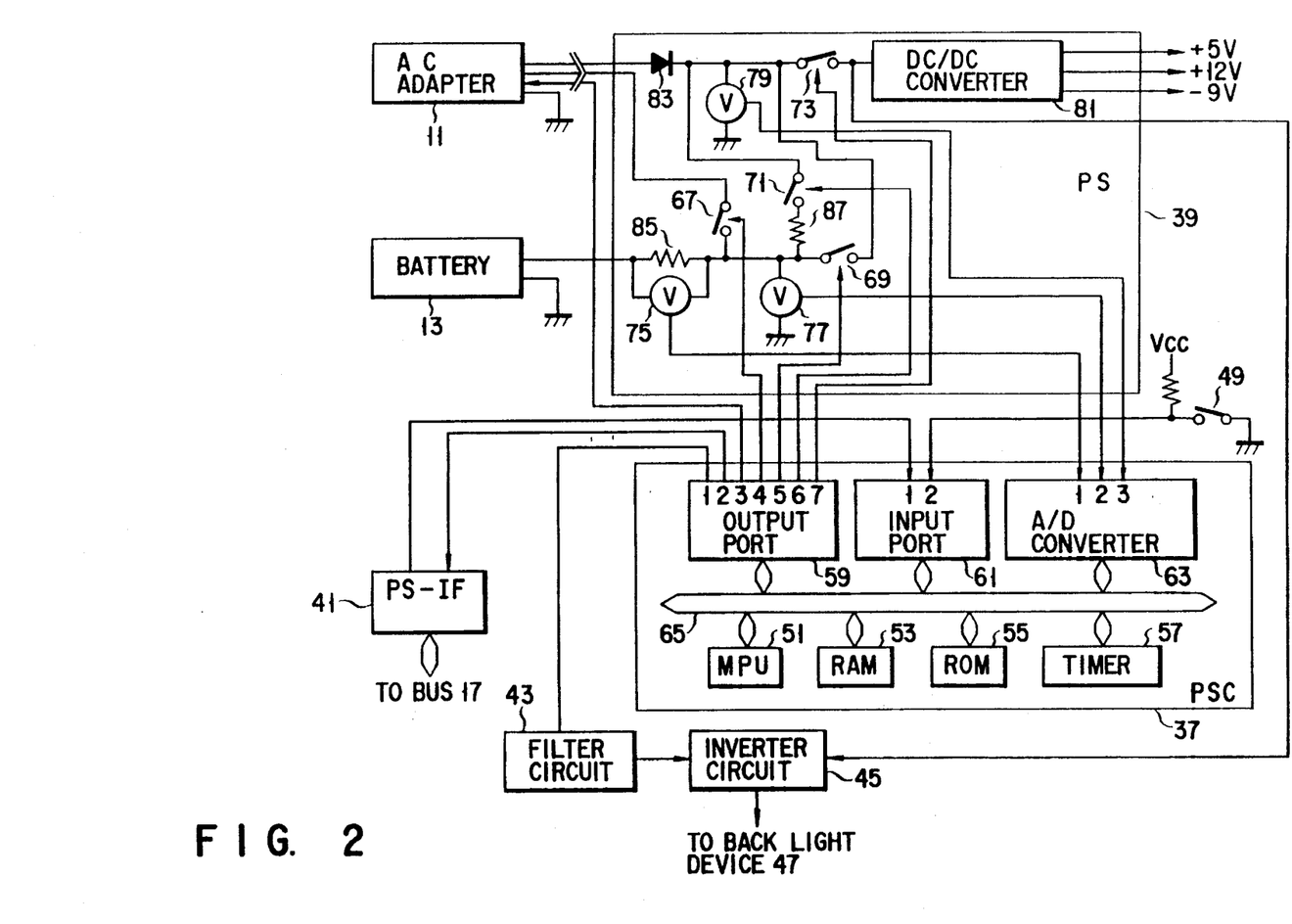
FIG. 2 is a block diagram, showing a power source circuit and a power source controller according to the invention.

FIG. 2 is a block diagram, showing the PSC 37 and the PS 39. The basic structure of FIG. 2 is disclosed in detail in US application No. 07/784,890, which is abandoned and Ser. No. 08/207,809 (filed Oct. 30, 1991).

The PSC 37 is made of, for example, Toshiba TMP47C660F, and has a micro processor unit (MPU) 51, a RAM 53, a ROM 55, a timer 57, an output port 59, an input port 61, and an analog/digital (A/D) converter 63. Each component of the PSC 37 is connected to an internal bus 65. The ROM 55 stores a power source control program (PSCP). The MPU 51 performs calculation in accordance with the PSCP. The RAM 53 temporarily stores the calculation results of the MPU 51 and data items input thereto via the input port 61 and the A/D converter 63.

A first output terminal of the output port 59 is connected to the filter circuit 43, for supplying the same with pulses generated at regular intervals. A second output terminal of the output port 59 is connected to the PS-IF 41, for outputting communication data to the CPU 15. A third terminal of the output port 59 is connected to the AC adapter 11, for outputting thereto adapter control data. The adapter control data indicates which of a constant current and a constant voltage should be output from the AC adapter 11. A fourth output terminal of the output port 59 is connected to a first switch 67, to output a first switch control signal for turning on/off the first switch 67. A fifth output terminal of the output port 59 is connected to a second switch 69, to output a second switch control signal for turning on/off the second switch 69. A sixth output terminal of the output port 59 is connected to a third switch 71, to output a third switch control signal for turning on/off the third switch 71. A seventh output terminal of the output port 59 is connected to a fourth switch 73, to output a fourth switch control signal for turning on/off the fourth switch 73.

A first input terminal of the input port 61 is connected to the PS-IF 41, for receiving communication data from the CPU 15. A second input terminal of the input port 61 is connected to the power switch 49, for receiving the power source on- and off-signals therefrom. When the power switch 49 is not pushed, the voltage level of the second input terminal is Vcc. When the switch 49 is pushed, the voltage level of the same is 0 V. The PSC 37 detects variation in voltage level via the input port 61, to determine whether or not the switch 49 is pushed. The PSC 37 recognizes the power source on-signal or off-signal by determining whether variation in voltage level is caused in the operative state of the PS 39 or in the inoperative state thereof.

A first analog input terminal of the A/D converter 63 is connected to a first voltmeter 75, for receiving an analog signal therefrom. A second analog input terminal of the A/D converter 63 is connected to a second voltmeter 77, for receiving an analog signal therefrom. A third analog input terminal of the A/D converter 63 is connected to a third voltmeter 79, for receiving an analog signal therefrom. The converter 63 converts the analog signals input to the first through third analog input terminals, to digital signals, and outputs the digital signals to the internal bus 65.

The AC adapter 11 has an adapter input terminal, and first and second adapter output terminals. A constant voltage is generated from the first adapter output terminal, while a constant current is generated from the second adapter output terminal. The adapter input terminal is connected to the third output terminal of the output port 59, and receives control data therefrom. In response to the control data input to the adapter input terminal, the AC adapter 11 outputs a constant voltage from the first adapter output terminal, or outputs a constant current from the second adapter output terminal.

The PS 39 has first through fourth switches 67, 69, 71, and 73, first through third voltmeters 75, 77, and 79, a DC/DC converter circuit 81, a diode 83, and first and second resistors 85 and 87. The first through fourth switches are FET switches. The first switch 67 is used to allow or inhibit supply of the constant current from the second adapter output terminal of the AC adapter 11 to the battery 13. When the AC adapter 11 is connected to the computer system and the first switch 67 is turned on, charging current is supplied from the AC adapter 11 to the battery 13 so as to perform quick charging. The second switch 69 is used to allow or inhibit supply of DC voltage from the battery 13 to the DC/DC converter 81. When the battery 13 is connected to the computer system and the second switch 69 is turned on, DC voltage is supplied from the battery 13 to the DC/DC converter 81. The third switch 71 is used to allow or inhibit supply of constant voltage from the second adapter output terminal of the AC adapter 11 to the battery 13. When the AC adapter 11 is connected to the computer system and the third switch 71 is turned on, constant voltage is supplied to the battery 13 via the second resistor 87 for performing trickle charge, so as to perform trickle charge. The fourth switch 73 is used to allow or inhibit supply of DC voltage from the first adapter output terminal of the AC adapter 11 or from the battery 13 to the DC/DC converter 81. When the AC adapter 11 is connected to the computer system and the fourth switch 73 is turned on, DC voltage is supplied from the AC adapter 11 to the DC/DC converter 81, while when the battery 13 is connected to the computer system and the second and fourth switches 69 and 73 are turned on, DC voltage is supplied from the battery 13 to the DC/DC converter 81. When DC voltage is supplied from the AC adapter 11 or the battery 13, the DC/DC converter 81 outputs driving voltage. When the fourth switch 73 is turned on, DC voltage is supplied from the AC adapter 11 or the battery 13 to the inverter circuit 45.

The first voltmeter 75 is a differential amplifier for measuring the potential difference between the both opposite ends of the first resistor 85. A detection signal from the first voltmeter 75 is input to the first analog input terminal of the A/D converter 63. The resistance of the first resistor 85 is preset. The PSC 37 can determine the consumption current of the battery 13 from the detection signal input to the first analog input terminal and the resistance of the first resistor. The second voltmeter 77 is a differential amplifier for measuring the output voltage of the battery 13. A detection signal from the voltmeter 77 is input to the second analog input terminal of the A/D converter 63. The PSC 37 can determine, from the detection signal input to the second analog input terminal, whether or not the battery 13 is connected to the computer system, whether or not the battery 13 is fully charged, and whether or not the battery is in a normal state. The third voltmeter 79 is a differential amplifier for measuring the output voltage of the AC adapter 11. A detection signal from the voltmeter 77 is input to the third analog input terminal of the A/D converter 63. The PSC 37 can determine, from the detection signal input to the third analog input terminal, whether or not the AC adapter 11 is connected, and whether or not the battery 13 is normal.

In the embodiment, the back light device 47, the HDD 31, and the CPU 15 are power variable components.

Figure 3A:
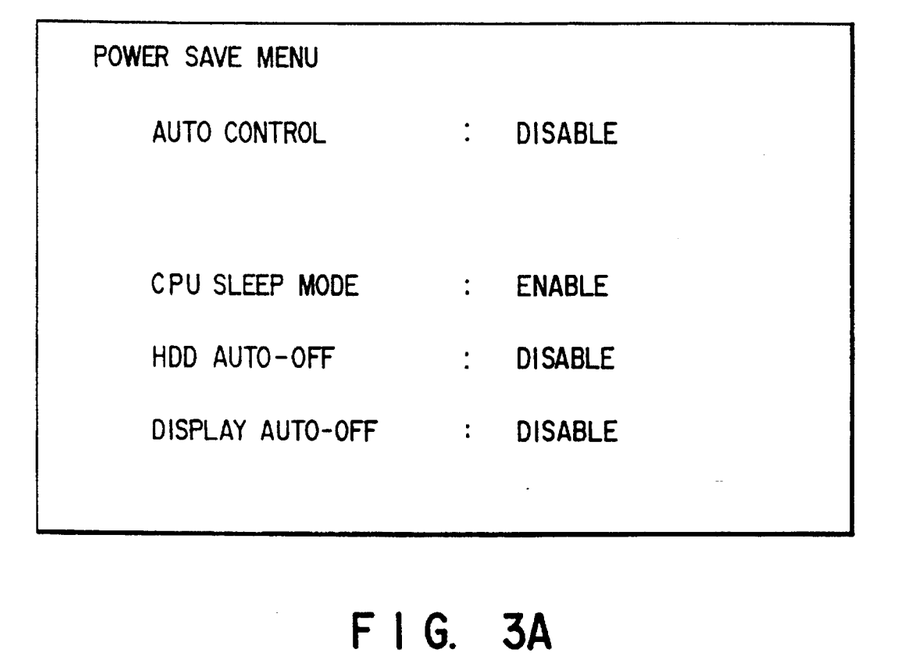
FIGS. 3A and 3B are a view, showing a power save menu to be used by the user for setting a time period for which the computer system is operated.
Figure 3B:
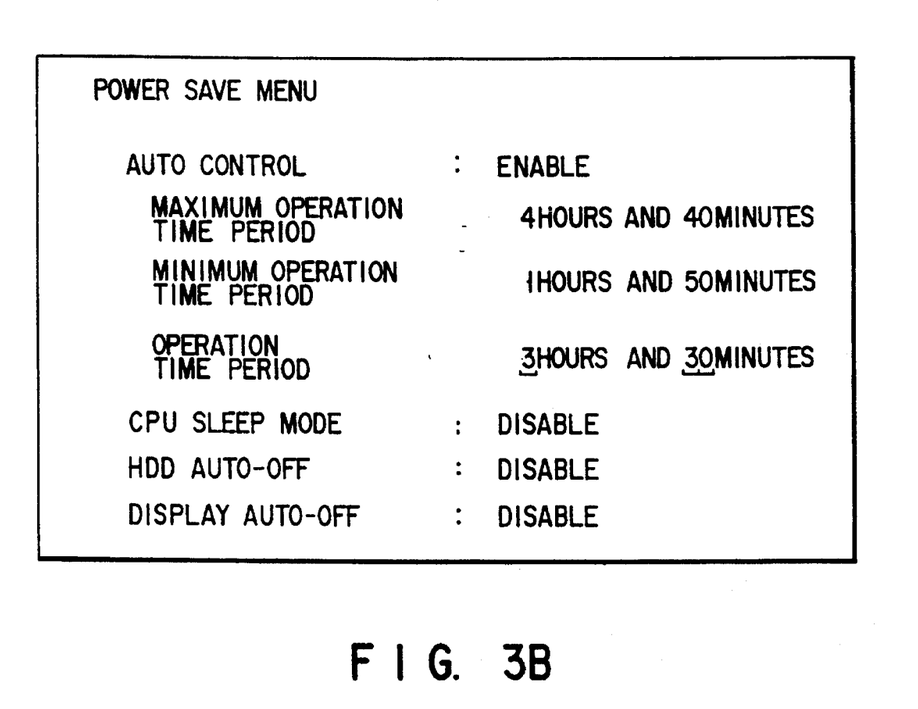

FIGS. 3A and 3B show a power save menu in the setup screen image of the computer system. The overall setup screen image is managed by the BIOS. The BIOS causes the setup screen image to be displayed on the LCD 35.

FIG. 3A shows a first part of the power save menu. In an auto-control item, the user sets whether or not the consumption power is automatically controlled in accordance with the operating time period of the computer designated by himself. The default value of the auto-control item is set at "disable". In a CPU sleep mode item, it is set whether or not the CPU sleep function is effected. The default value of the CPU sleep mode item is set at "enable". If the user wants to stop the execution of the CPU sleep function, he changes the CPU sleep mode item from "enable" to "disable" by key operation. In an HDD auto-off item, it is set whether or not the HDD auto-off function is effected. The default value of the HDD auto-of item is set at "disable". If the user wants to effect the HDD auto-off function singly, he changes the HDD auto-off item from "disable" to "enable" by key operation. When it is changed to "enable", the user can input, as a waiting time period, one of 1, 3, 5, 10, 15, 20, and 30 minutes. If, when data indicative of a predetermined time period is input in the HDD auto-off item, the user does not perform key operation until the set waiting time, the spindle motor of the HDD 31 is automatically stopped. In a display auto-off item, the user set whether or not the display auto-off function is effected. The default value of this item is set at "disable". If the user wants to effect the display auto-off function singly, he changes the display auto-off item from "disable" to "enable" by key operation. When it is changed to "enable", the user can input, as a waiting time period, one of 3, 5, 10, 15, 20, and 30 minutes. If, when data indicative of a predetermined time period is input in the display auto-off item, the user does not perform key operation until the set waiting time, the level of the brightness of the back light 47 is automatically lowered to a predetermined value.

FIG. 3B shows that second part of the power save menu which is obtained when "enable" is set in the auto-control item in FIG. 3A. If the user sets "enable" in the auto-control item, an operating time period item, a maximum operating time period item, and a minimum operating time period item are displayed. The operating time period item is where the user inputs his desired operating time period of the computer system. In FIG. 3B, the operating time period is set at 3.5 hours. The maximum and minimum operating time period items define a range, a value within which can be set in the operating time period item appearing when the setup screen image is displayed on the LCD 35. The time periods displayed in the maximum and minimum operating time period items are calculated in the PSC 37. The time period displayed in the maximum operation time period item is a maximum time period during which the computer system can operate with all power save functions effected to the full extent. The time period displayed in the minimum operating time period item is a minimum time period during which the computer system can operate with all power save functions disabled, and each component operates such that it can provide maximum performance (that is, it operates in a maximum power consumption state). The user cannot set the operating time period to a value outside the range defined by the maximum and minimum operating time periods. In FIG. 3B, the maximum operating time period is set to 4 hours and 40 minutes, and the minimum operating time period to 1 hour and 50 minutes. If "enable" is set in the auto-control item, "disable" is automatically set in the CPU sleep mode item, the HDD auto-off item, and the display auto-off item. Further, setting of the operating time period by the user can be carried out by use of a pop-up winder screen image in place of the setup screen image.

Figure 4:
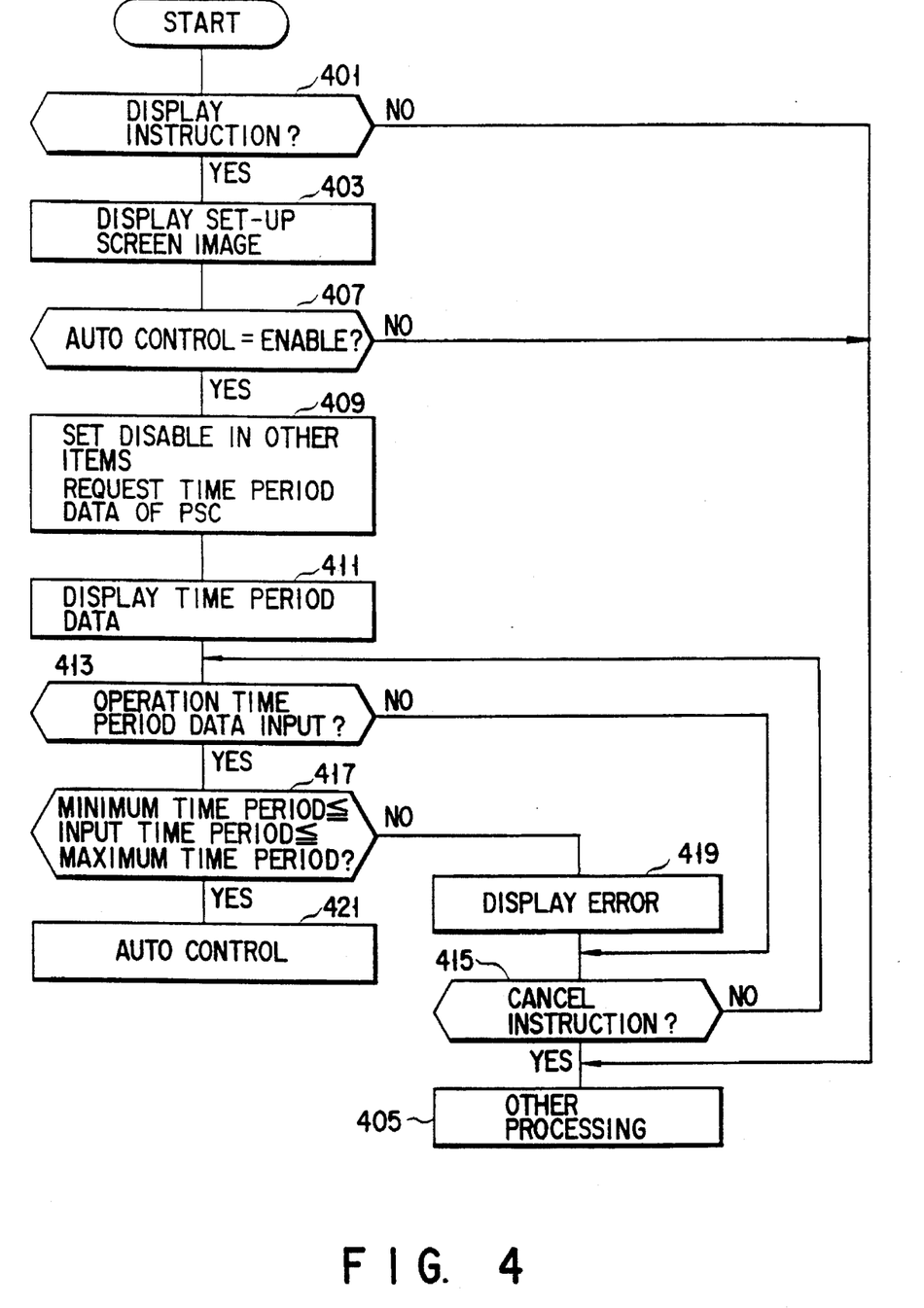
FIG. 4 is a flowchart, useful in explaining the operation of a system BIOS at the time of setting the operating time period in the power save menu.

Then, the operation of the BIOS at the time of setting the operating time period in the power save menu on the setup screen will be explained. FIG. 4 is a flowchart, useful in explaining the operation of the BIOS in this case.

The BIOS monitors whether or not the user instructs display of the setup screen image (step 401). If display of the setup screen image is instructed, the BIOS displays the setup screen image on the LCD 35 (step 403). If, on the other hand, no instruction is given by the user, other processing is performed (step 405). The BIOS monitors whether or not the user sets "enable" in the auto-control item of the power save menu after the setup screen image is displayed (step 407). If "enable" is set, the BIOS sets "disable" in the CPU sleep mode item, the HDD auto-off item, and the display auto-off item, and requests, via the PS-IF 41, the PSC 37 to output maximum and minimum operating time period data items (step 409). Upon receiving the data items from the PSC 37, the BIOS displays them in the maximum and minimum operating time period items (step 411). If "enable" is not set in the auto-control item, the program proceeds to the step 405.

After the step 411, the BIOS monitors whether or not the user inputs time data in the operation time item (step 413). If no time data is input, the BIOS monitors whether or not a cancel instruction is input (step 415). If the cancel instruction is input, the program proceeds to the step 405, whereas if it is not input, the program returns to the step 413, where the BIOS is in the waiting state until time data is input in the operating time period item. When time data is input in the operating time period item, the BIOS determines whether or not the input time data falls within a range defined by the maximum and minimum operating time periods (step 417). If it does not fall within the range, the BIOS displays on the screen an error message indicating that the input time data is invalid (step 419). After the step 419, the program returns to the step 413 by way of the step 415. If, on the other hand, the input time data falls within the range, the BIOS effects or instructs automatic control of the power consumption (step 421).

Figure 5:
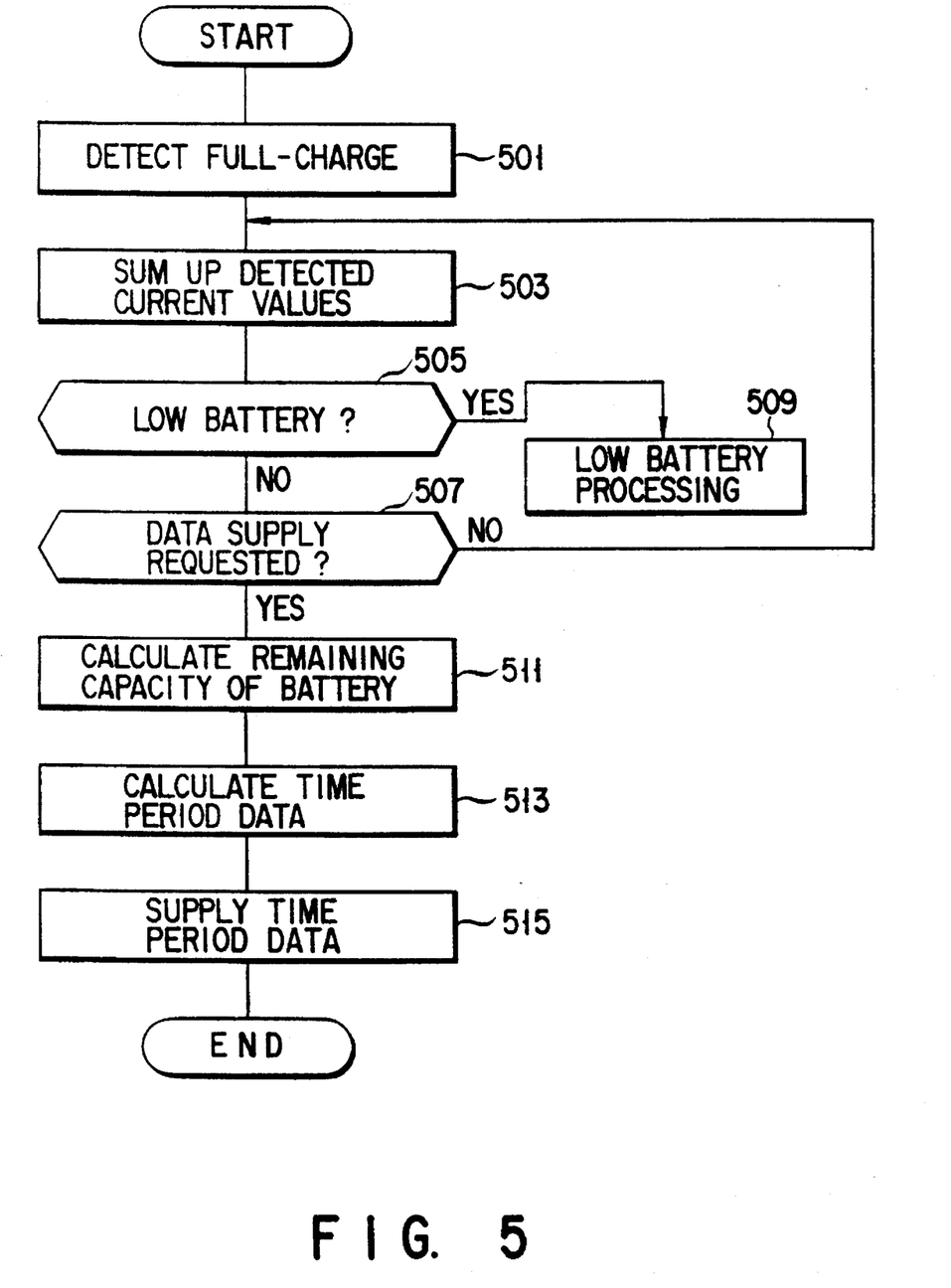
FIG. 5 is a flowchart, useful in explaining a method for monitoring a discharge state of a battery by means of the power source controller.

The PSC 37 monitors the discharge state of the battery 13. FIG. 5 is a flowchart, useful in explaining a method for monitoring a discharged state of the battery 13 by the PSC 37. The PSC 37 detects the fully charged state of the battery 13 (step 501). When a detection signal from the second voltmeter 77 has a predetermined full-level value, it is determined that the battery 13 is fully charged. The capacity of the battery 13 in the fully charged state is preset. The PSC 37 recognizes the capacity of the battery 13 when it detects the fully charged state thereof. When the battery 13 starts to discharge, the PSC 37 periodically detects the value of current from the detection signal of the first voltmeter 75, and sums up the detected values of current (step 503). The summed value indicates the power consumption of the battery 13 during detection. The PSC 37 detects the current value every second, and calculates and stores the sum of the detected values. The PSC 37 monitors whether or not the battery 13 is at low level (step 505), and whether or not there is a request for time data from the BIOS (step 507). If the battery is not at low level, and there is no request for supply of time data, the PSC 37 repeatedly performs the processing in the step 503. The PSC 37 recognizes that the battery 13 is at low level when the detection signal of the second voltmeter 77 reaches a predetermined low level. When the battery becomes low level, the PSC 37 performs low-battery processing (step 509).

when there is a request for supply of time data from the BIOS in the step 409 of FIG. 4, the PSC 37 subtracts consumed power from the maximum capacity of the battery 13, thereby providing the remaining capacity of the battery 13 (step 511). The PSC 37 divides the calculated remaining capacity by maximum and minimum consumption current values, thereby obtaining maximum and minimum operation time data items, respectively (step 513). The maximum and minimum consumption current values of the computer system are preset. If the maximum and minimum consumption current values are 1200 mA and 400 mA, respectively, the maximum capacity of the battery 13 is 2400 mA·H, and the consumption of the battery is 600 mA·H when there is a request from the BIOS, the minimum and maximum operating time periods are 1.5 hours and 4.5 hours, respectively. After calculation of the minimum and maximum operating time periods, the PSC 37 supplies the BIOS with data items indicating the periods (step 515).

Figure 6:
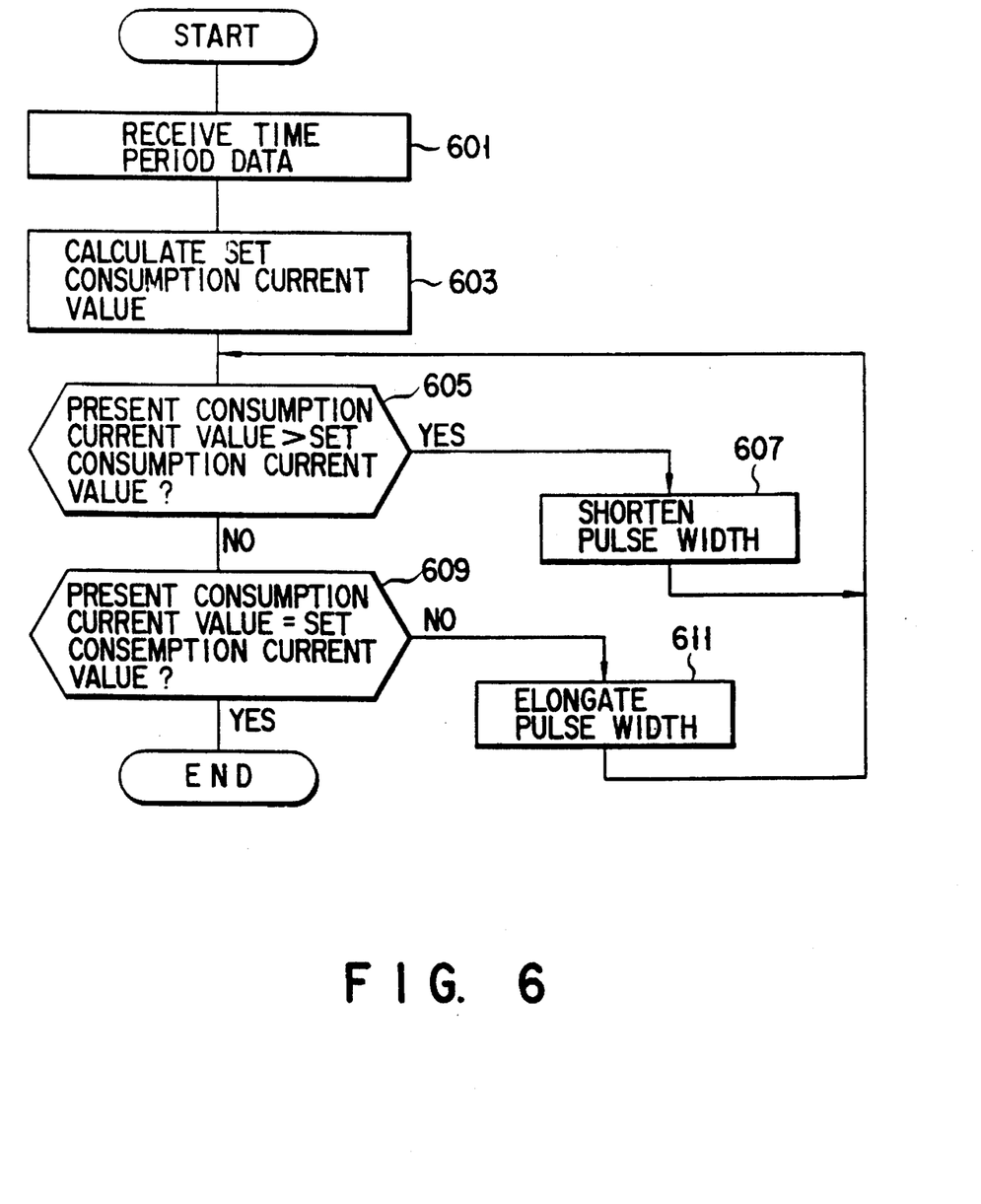
FIG. 6 is a flowchart, useful in explaining a method for automatically controlling the power consumption of a back light device only.

Auto-control of power consumption is performed in the following manner. FIG. 6 is a flowchart, useful in explaining a method for automatically controlling the power consumption of a back light device only. If it is determined in the program shown in FIG. 4 that the operating time period data input by the user is appropriate, the BIOS supplies it to the PSC 37. When the PSC 37 receives the data (step 601), it divides the remaining capacity of the battery 13 by the operating time period to obtain a consumption current value to be set (step 603). If the maximum capacity of the battery 13 is 2400 mA·H, the consumption of the same is 600 mA·H when a request is given from the BIOS, and the operating time period input by the user is 3 hours, the set consumption current value is obtained by dividing 1800 mA·H by 3 hours (=600 mA). After calculation of the set consumption current value, the PSC 37 determines whether or not the actual consumption current value is higher than the set consumption current value (step 605). The PSC 37 calculates the actual consumption current value by use of data supplied from the first voltmeter 75, and the resistance of the first resister (in FIG. 2). If the actual consumption current value is higher than the set value, the PSC 37 shortens the width of a pulse signal supplied from the first output terminal of the output port 59 to the filter circuit 43 (step 607). When the level of the analog signal is lowered, the inverter circuit 45 reduces the value of current to be supplied to the back light device 47, which lowers the level of the brightness of the fluorescent tube of the device 47, resulting in a reduction in the consumption current value thereof.

After reducing the consumption current value of the back light device 47, the program returns to the step 605, where the PSC 37 determines whether or not the reduced consumption current value is higher than the set consumption current value. If the actual consumption current value is not larger than the set value, the PSC 37 determines whether or not the former is equal to the latter (step 609). If they are equal to each other, the PSC 37 keeps the width of the pulse signal to be supplied to the filter circuit 43, as the present value, and terminates the processing. If, on the other hand, the actual consumption current value is not equal to the set value, the PSC 37 lengthens the width of the pulse signal to be supplied to the filter circuit 43 so as to increase, by a predetermined value, the level of the analog signal to be supplied to the inverter circuit 45 (step 611). When the level of the analog signal is increased, the inverter circuit 45 increases the value of current to be supplied to the back light device 47. Increasing the current value increases the brightness of the fluorescent tube of the device 47 and hence the consumption current value thereof. The PSC 37 repeats the processing in the steps 605 through 609, thereby changing the pulse width so as to make the actual consumption current value equal to the set value.

Figure 7:
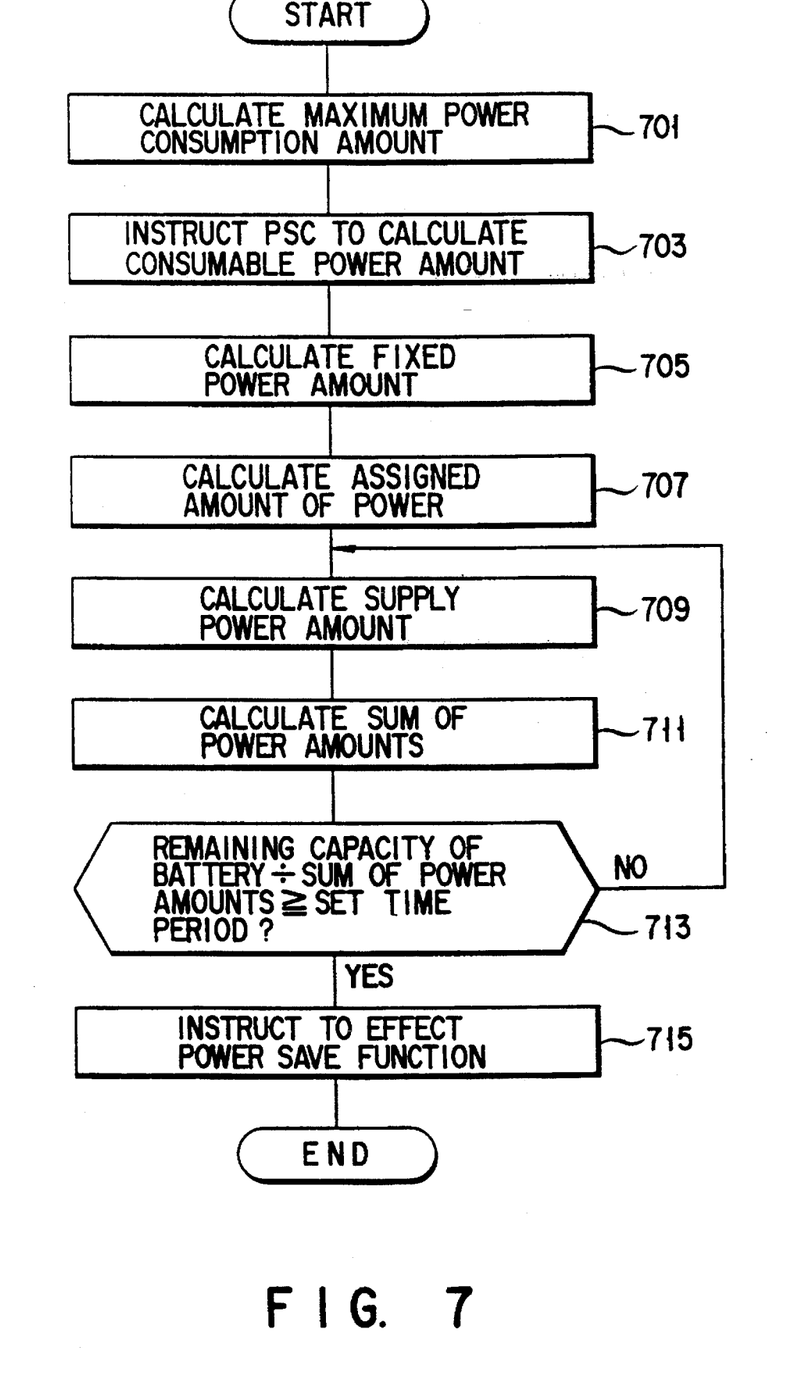
FIG. 7 is a flowchart, useful in explaining a method for automatically controlling the power consumption at the time of effecting all power save functions.

FIG. 7 is a flowchart, useful in explaining a method for automatically controlling the power consumption at the time of effecting the display auto-off function, the CPU sleep function, and the HDD auto-off function. If it is determined in the program shown in FIG. 4 that the operating time period data set by the user is appropriate, the BIOS calculates the maximum power consumption of the overall system per unit-hour in a state where each component of the system is operated to the full extent of its capacity (step 701). The power consumption of each component at the time of operating to the full extend of its capacity is preset, and the BIOS calculates the maximum power consumption by summing up the power consumption of the overall components. After calculation of the maximum power consumption, the BIOS divides the remaining capacity of the battery 13 by the time period data set in the operating time period item, to obtain the amount of power which can be consumed per unit-hour (step 703).

Then, the BIOS calculates the amount of power to be assigned to each component. Specifically, first, the BIOS sums up the power amounts (hereinafter called "fixed power amounts") of components which require power of a predetermined level at all times (step 705). In the embodiment, elements other than the CPU 15, the HDD 31, and the back light device 47 are supplied with fixed power. After summing up the fixed power amounts, the BIOS subtracts the sum of the fixed power amounts from the maximum power consumption, to obtain the amount of power to be supplied to each power-consumption-variable component (step 707). Thereafter, the BIOS sets the amount of power to be supplied to each power-consumption-variable component (CPU 15, HDD 31, back light device 47) (step 709).

The BIOS prestores a power consumption amount estimated when the CPU sleep function is enabled. Further, the BIOS prestores a power consumption amount per unit-hour corresponding to each waiting time period and estimated when the HDD auto-off function is enabled. In addition, the BIOS prestores a power consumption amount per unit-hour, which corresponds to each reduced brightness level and each waiting time period, and is estimated when the display auto-off function is enabled. The above estimated power consumption means a power consumption amount obtained from an estimated rate of use per unit-hour of each component. The reduced brightness level means a level to which the brightness is lowered after each waiting time period elapses. In the embodiment, a level obtained by reducing the maximum brightness level by 5% can be set as the reduced brightness level. The BIOS prepares groups each consisting of a preset estimated power consumption to effect the CPU sleep function, an estimated power consumption to effect the HDD auto-off function when a desired waiting time period is set, and an estimated power consumption to effect the display auto-off function when a desired waiting time period and a desired reduced brightness level are set. The BIOS selects that one of the groups in which the sum of the estimated power consumption amounts is substantially equal to the amount of power which can be consumed (however, the former is not larger than the latter). It may be constructed such that the BIOS stores a table of all combinations of estimated power consumption amounts, and an appropriate combination be selected by searching the table. Further, if there are several groups or combinations in which the sum of the estimated power consumption amounts is substantially equal to the consumable power amount, the BIOS selects one of them by any of the following methods:

In a first method, a group is selected in which the rate of performance deterioration of a component is substantially equal to that of any other component. In a second method, an optimal group is selected from groups in which the rate of performance deterioration of a predetermined component is lower by a certain level than that of any other component. The first method is advantageous in that performance deterioration of a particular component is not conspicuous. On the other hand, the second method is advantageous in that though performance deterioration of a particular component is conspicuous, that of any other component can be minimized.

After the BIOS calculates the amount of power to be supplied to each power-consumption-variable component in the step 709, it adds the fixed power amount thereto (step 711). Subsequently, it divides the remaining capacity of the battery 13 by the addition result, to determine whether or not the division result is longer than the time period set by the user (step 713). If the division result is not longer than the set time period, the program returns to the step 709, where the BIOS selects another group. If, on the other hand, the division result is longer than the set time period, the BIOS instructs each power-consumption-variable component to effect its power save function at the level determined in the step 709 (step 715).

Figure 8:
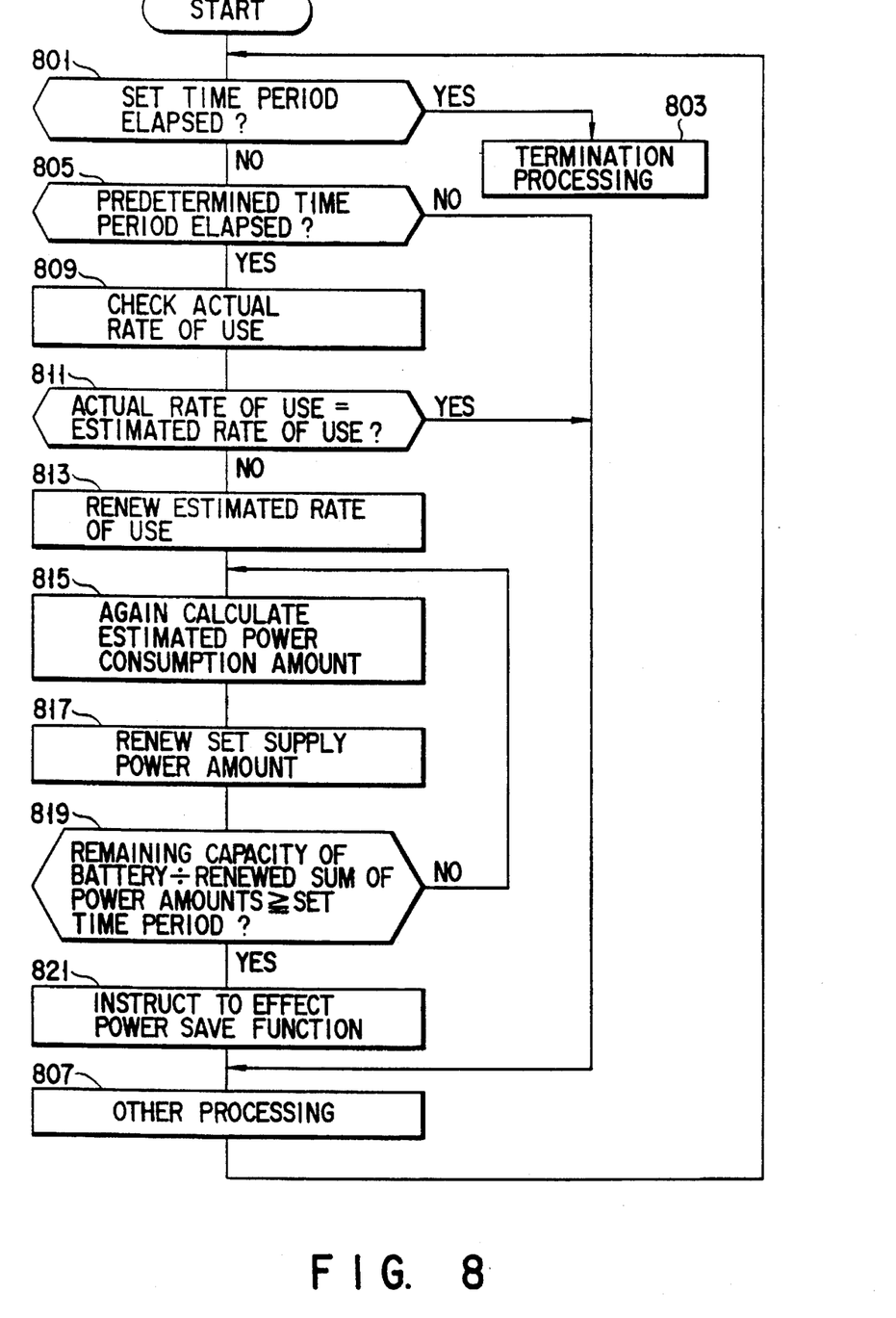
FIG. 8 is a flowchart, useful in explaining a method of correcting power consumption control.

In FIG. 7, the BIOS calculates the supply power amount on the basis of the estimated power consumption determined from the estimated rate of use of each power-consumption-variable component. Accordingly, if the actual use rate of each power-consumption-variable component differs from the estimated value, power consumption control based on the time period set by the user cannot be performed. To avoid this, it is desirable that the BIOS monitors the actual use rate of each power-consumption-variable component at regular intervals, and that when there is a difference between the actual and estimated use rates, the power supply amount is corrected so as to correspond to the time period set by the user. FIG. 8 is a flowchart, useful in explaining a correction method of automatic control of power consumption. After starting automatic control, the BIOS performs regular interruption processing to determine whether or not the operating time period of the computer system reaches the time period set by the user (step 801). It the operating time period reaches the set time period, the BIOS performs termination processing of the system (step 803). If the operating time period does not reach the set time period, the BIOS determines whether or not a predetermined time period has elapsed (step 805). If the predetermined time period has not elapsed, the BIOS performs other processing (step 807), and the program returns to the step 801. If the predetermined time period has elapsed, the BIOS calculates the actual use rate of each power-consumption-variable component during the predetermined time period (step 809). Thereafter, it determines whether or not the actual use rate of each power-consumption-variable component is equal to the estimated use rate at the time when a first estimated power consumption was obtained (step 811). If they are equal to each other, the program returns to the step 807. If, on the other hand, they are not equal to each other, the BIOS uses the actual use rate as the estimated one (step 813). Then, the BIOS calculates again an estimated power consumption of each power-consumption-variable component on the basis of the renewed estimated use rate (step 815). Subsequently, the BIOS corrects the amount of power to be supplied to each power-consumption-variable component (step 817). After correction, it divides the remaining capacity of the battery 13 by the power amount, which is obtained by adding the fixed power amount to the corrected power amount, and determines whether or not the division result is longer than the time period set by the user (step 819). If the division result is not longer than the set time period, the program returns to the step 815, where the BIOS changes again the supply power amount. If the division result is longer than the set time period, the BIOS instructs each power-consumption-variable component to effect its power save function at the level set in the step 817 (step 821), followed by the program returning to the step 807.

Figure 9:
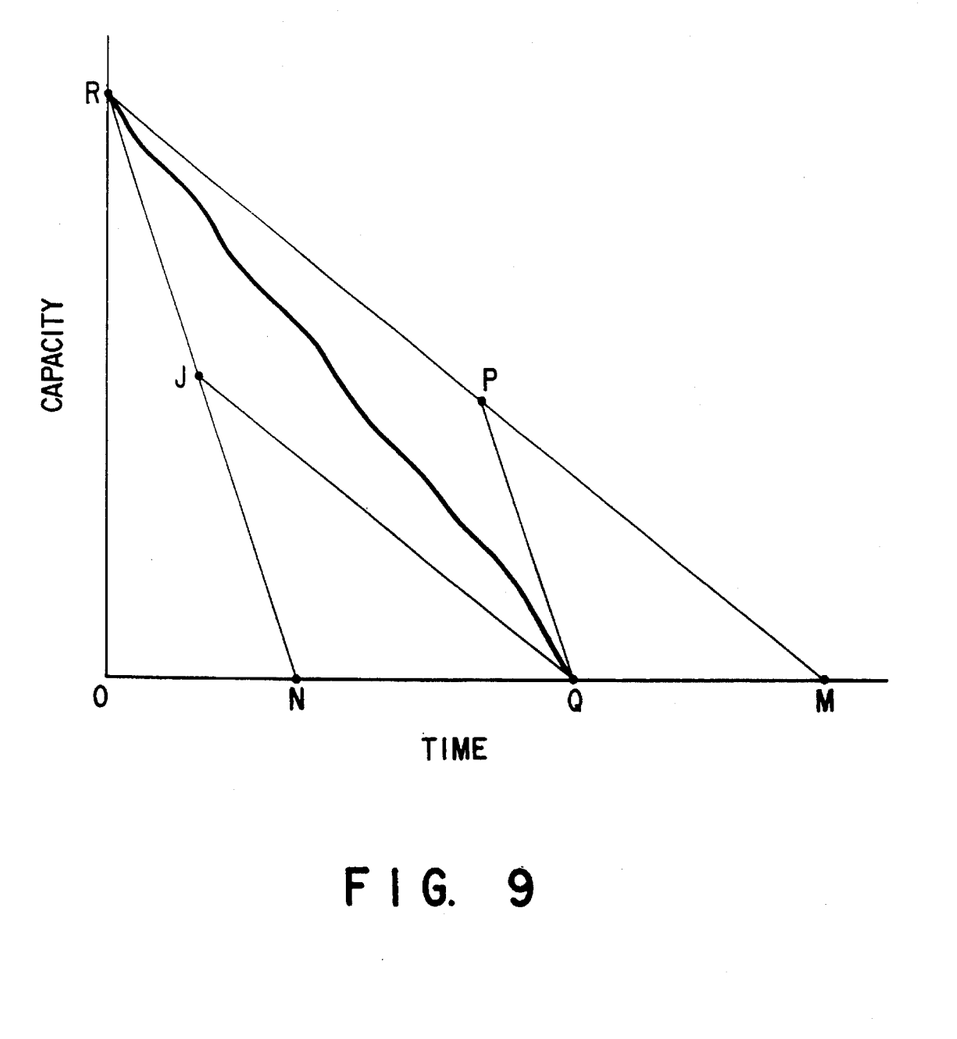
FIG. 9 is a graph, showing the relationship between the remaining capacity of a battery and the operating time period of the system in the case where correction control of the power consumption is performed.

FIG. 9 is a graph, showing the relationship between the remaining capacity of the battery and the operating time period of the computer system in the case where correction control of the power consumption is performed. The axis of abscissa indicates the operating time period of the computer system, and the axis of ordinate indicates the remaining capacity of the battery. Point R indicates the remaining capacity of the battery when t=0, that is, it indicates the capacity of the battery in the full charged state. Point N indicates a minimum time period required to empty the charge of the battery while each component is operated to the full extent of its capacity, from the full charged state of the battery. Point M indicates a maximum time period required to empty the charge of the battery while all power save functions are effected to the full extent. Line R-N indicates decreases in the capacity of the battery from the full charged state in the case where each component is operated to the full extent of its capacity. Line R-M indicates decreases in the capacity of the battery from the full charged state in the case where all power save functions are effected to the full extent. When the battery is in the full charged state, the time period indicated by the point M is input in the maximum operating time period item, and the time period indicated by the point N in the minimum operating time period item. The user can set a desired time period within a range from M to N. Point Q indicates a time period set by the user. Lines Q-J and Q-P are parallel with lines R-M and R-N, respectively. The BIOS or PSC 37 controls the power consumption of each power-consumption-variable component so that the remaining capacity of the battery can be varied within a range defined by the lines R-J, J-Q, Q-P, and P-R, so as to converge into the point Q. Line R-Q indicates actual variation in the remaining capacity of the battery.

As explained above, the present invention is applicable to an electronic device driven, in particular, by a battery, such as a portable computer or word processor, since power consumption is automatically controlled in accordance with a time period set by the user.

We claim:

1. An electronic device driven by a battery, comprising:

a device component driven by power supplied from the battery;

time period setting means for setting an operating time period during which the electronic device is operated by the battery;

capacity detection means for detecting a remaining capacity of the battery; and power control means for controlling the amount of power supplied to the device component on the basis of the operating time period set by the time period setting means and the remaining capacity detected by the capacity detection means.

2. An electronic device driven by a battery, comprising:

a transmission-type liquid crystal display device for displaying data items;

an inverter circuit for inverting a voltage supplied from the battery, to a predetermined voltage;

a back light device, provided on a reverse side of the transmission-type liquid crystal display device, and supplied with the predetermined voltage from the inverter circuit to emit light;

time period setting means for setting an operating time period during which the electronic device is operated by the battery;

capacity detection means for detecting a remaining capacity of the battery; and power control means for controlling the value of current supplied from the inverter circuit to the back light device on the basis of the operating time period set by the time period setting means and the remaining capacity detected by the capacity detection means.

3. The electronic device according to claim 2, wherein the control means has current value detection means for detecting a first consumption value of current actually consumed by the battery; current value calculation means for calculating a second consumption value of current corresponding to the operating time period by dividing the remaining capacity by the operating time period; current value control means for controlling the value of current supplied from the inverter circuit to the back light device so as to make the first and second consumption values of current equal to each other.

4. The electronic device according to claim 3, wherein the control means is a processor which has a first memory for storing control programs for the current value detection means, the current value calculation means, and the current value control means; a second memory for storing data items; and a processor for outputting a signal for controlling the value of current supplied from the inverter circuit to the back light device.

5. An electronic device driven by a battery, comprising:

a device component driven by power supplied from the battery;

power save means for reducing the amount of power consumed by the device component under a predetermined condition;

time period setting means for setting an operating time period during which the electronic device is operated by the battery;

capacity detection means for detecting a remaining capacity of the battery; and level setting means for automatically setting in the power save means the reduced amount of the power consumed by the device component, said reduced amount being determined by the operating time period and the remaining capacity.

6. The electronic device according to claim 5, wherein the level setting means prestores estimated power consumption data corresponding to the reduced level of power consumed by the device component, and sets the reduced level in accordance with the estimated power consumption data.

7. The electronic device according to claim 6, wherein the estimated power consumption data is determined on the basis of an estimated rate of use of the device component.

8. The electronic device according to claim 7, further comprising correction means for detecting the actual rate of use of the device component at regular intervals, correcting the estimated rate of use when the estimated rate of use differs from the actual rate of use, and renewing the power consumption of the overall electronic device in accordance with the operation time period on the basis of the corrected estimated rate of use.

9. The electronic device according to claim 5, wherein the device component has a first component and a second component of a type differing from that of the first component; the power save means has first power save means for reducing the power consumption of the first component under a first condition, and second power save means for reducing the power consumption of the second component under a second condition; and the level setting means determines the power consumption of the overall electronic device in accordance with the operation time period by summing up those reduced levels of the power consumption amounts of the first and second components, which are obtained by the first and second power save means.

10. The electronic device according to claim 9, wherein the level setting means prestores estimated power consumption data items corresponding to the reduced levels of power consumed by the first and second components, and sums up the reduced levels of the first and second components in accordance with the estimated power consumption data items.

11. The electronic device according to claim 10, wherein the estimated power consumption data items are determined on the basis of estimated rates of use of the first and second components.

12. The electronic device according to claim 11, further comprising correction means for detecting the actual rates of use of the first and second components at regular intervals, correcting the estimated rates of use when the estimated rates of use differs from the actual rates of use, respectively, and renewing the power consumption of the overall electronic device in accordance with the operation time period on the basis of the corrected estimated rates of use.

13. An electronic device, comprising:

a battery;

a device component driven by power supplied from the battery;

data input means for inputting an operating time period data during which the electronic device is operated by the battery;

capacity detection means for detecting a remaining capacity of the battery; and power controlling means for controlling the amount of power supplied to the device component on the basis of the operating time period data input from the data input means and the remaining capacity detected by the capacity detection means.

14. An electronic device having a data input device, comprising;

a battery;

a device component driven by power supplied from the battery;

a memory storing an operating time period data during which the electronic device is operated by the battery, the operating time period data input from the data input means;

capacity detection means for detecting a remaining capacity of the battery; and power controlling means for controlling the amount of power supplied to the device component on the basis of the operating time period data stored in the memory and the remaining capacity detected by the capacity detection means.

* * * * *